United States Patent Office 3,169,134
Patented Feb. 9, 1965

3,169,134
2,3-OXYGENATED-17α-METHYL-5α-ANDROSTAN-17β-OLS
Paul D. Klimstra, Northbrook, Ill., assignor to G. D. Searle & Co., Chicago, Ill., a corporation of Delaware
No Drawing. Filed Mar. 21, 1963, Ser. No. 266,797
8 Claims. (Cl. 260—397.4)

The present invention relates to 2,3-dioxygenated derivatives of 17α-methyl-5α-androstan-17β-ol. That is, it relates to compounds wherein the 2 and 3-positions are occupied by substituents such as oxo, hydroxy, methoxy, and (lower alkanoyl)-oxy. More particularly, it relates to compounds of the formula

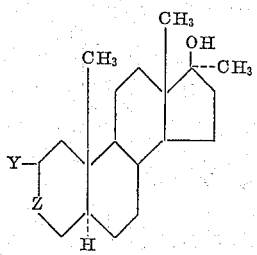

wherein Y is selected from the group consisting of methoxy and (lower ankanoyl)oxy and Z is selected from the group consisting of α-hydroxymethylene and carbonyl; the invention also relates to compounds of the formula

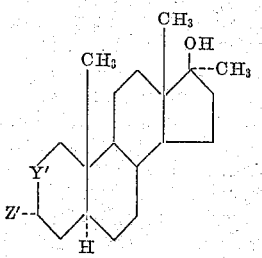

wherein Y' is selected from the group consisting of β-hydroxymethylene and carbonyl and Z' is selected from the group consisting of methoxy and (lower alkanoyl)oxy. Thus, it will be obvious that the 2 and 3-substituents are selected in such a manner that one of them is hydroxy or oxo while the other is methoxy or (lower alkanoyl)oxy.

The lower alkanoyl radicals referred to above contain up to six carbon atoms and are exemplified by radicals such as acetyl, propionyl, butyryl, pentanoyl, and hexanoyl.

Starting materials which are particularly useful for the preparation of the compounds of the present invention are the 2,3-epoxy-17α-methyl-5α-androstan-17β-ols. The 2α,3α-epoxide is obtained by peracetic acid epoxidation of the corresponding 2-androstene whereas the corresponding 2β,3β-epoxide is obtained by treating the corresponding 2β-hydroxy-3α-bromoandrostane with sodium carbonate.

If the 2β,3β-epoxide is heated with a lower alkanoic acid, the corresponding 3α-(lower alkanoyl)oxy-17α-methyl-5α-androstane-2β,17β-diol is obtained. On the other hand, if the 2β,3β-epoxide is heated with methanol in the presence of a trace of acid, 3α-methoxy-17α-methyl-5α-androstane-2β,17β-diol is obtained. When the 2α,3α-epoxide is used as a starting material, heating with a lower alkanoic acid gives the corresponding 2β-(lower alkanoyl)oxy-17α-methyl-5α-androstane-3α,17β - diol, whereas heating with methanol in the presence of a trace of sulfuric acid gives 2β-methoxy-17α-methyl-5α-androstane-3α,17β-diol.

The androstan-3α-ols, substituted in the 2β-position with methoxy or (lower alkanoyl)oxy, can be converted to the corresponding androstan-3-one by oxidation. The same procedure can be used to prepare the androstan-2-ones from the corresponding 2β-hydroxy compounds. A favored oxidizing agent for this purpose is a solution of chromium trioxide in sulfuric acid.

An alternate approach to the preparation of the methoxy compounds of the present invention makes use of the 2,3-epoxy-5α-androstan-17-ones. Treatment of the 2β,3β-epoxide with methanol in the presence of acid gives 2β-hydroxy-3α-methoxy-5α-androstan-17-one whereas reaction of the 2α,3α-epoxy compound with the same reagent gives 3α-hydroxy-2β-methoxy-5α-androstan-17-one. Either of these monomethoxy compounds can then be reacted with an excess of methylmagnesium bromide to give the corresponding 2β,3α-disubstituted-17α-methyl-5α-androstan-17β-ol.

The compounds of the present invention are useful because of their valuable pharmacological properties. They are, for example, anti-estrogenic agents as is evidenced by their ability to inhibit estrogen-stimulated biological responses.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in part by weight unless otherwise noted.

Example 1

To a solution of 5 parts of 3α-HTHTHnLHTRARAT androstane-2β,17β-diol (Example 17, U.S. Patent 3,018,-298) in 317 parts of tetrahydrofuran is added a solution of 1.5 parts of sodium carbonate in 103 parts of water. The resultant mixture is stirred for 47 hours at room temperature before it is poured into ice water. The precipitate which forms is filtered, washed with water, and dried. Recrystallization of the solid from a mixture of acetone and hexane gives 2β,3β-epoxy-17α-methyl-5α-androstan-17β-ol, melting at about 157–159° C.; [α]_D= +25° (chloroform).

Example 2

A solution of 2 parts of 2β,3β-epoxy-17α-methyl-5α-androstan-17β-ol in 262 parts of glacial acetic acid is heated on a steam bath for 5 hours. The resultant mixture is poured into ice water whereupon an amorphous solid forms. The solid is separated and the aqueous portion is extracted with ether. The solid is combined with the ether extracts and the resultant solution is washed, first with water and then with 5% sodium bicarbonate solution, and dried over anhydrous potassium carbonate and characoal. The solvent is removed from the solution under reduced pressure to leave a solid which is recrystallized from a mixture of acetone and hexane to give 3α - acetoxy - 17α - methyl-5α-androstane-2β,17β-diol, melting at about 193-195° C.; [α]_D=—121° (chloroform). This compound has the following formula

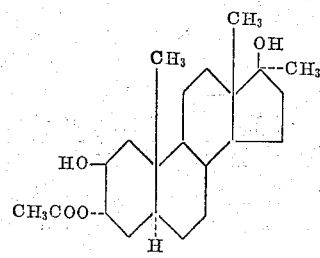

Example 3

If an equivalent quantity of propionic acid is substituted for the acetic acid and the procedure of Example 2 is repeated, the product is 3α-propionoxy-17α-methyl-5α-androstane-2β,17β-diol. The compound has the following formula

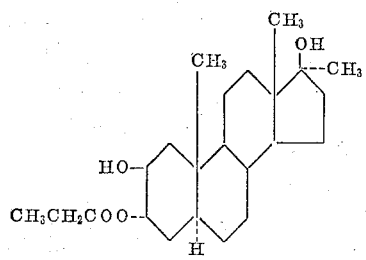

Example 4

To a solution of 2 parts of 3α-acetoxy-17α-methyl-5α-androstane-2β,17β-diol in 32 parts of acetone is added portionwise, with stirring, an aqueous solution which is 8 N in chromium trioxide and 8 N in sulfuric acid. The addition is continued until the brown color persists and then the excess chromium trioxide is destroyed by the addition of a few drops of 2-propanol. The resultant solution is decanted from the precipitated salts and into water and cooled. A precipitate forms and this is filtered, washed with water, and air dried. The solid is recrystallized from a mixture of acetone and n-hexane to give 3α-acetoxy-17 α-methyl-17β-hydroxy-5α androstan-2-one melting at about 172–175° C.; $[\alpha]_D = +35°$ (chloroform). This compound has the following formula

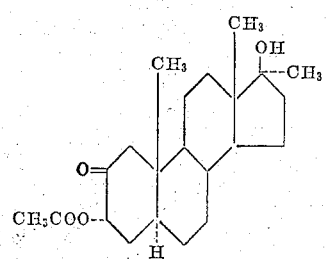

Example 5

A solution of 0.3 part of 2β,3β-epoxy-17α-methyl-5α-androstan-17β-ol in 4 parts of methanol containing one part of concentrated sulfuric acid is refluxed for 2 hours. The resultant solution is poured into ice water containing sodium bicarbonate to neutralize the sulfuric acid. The solid which separates is collected, washed with water, and dried. Recrystallization of this solid from a mixture of acetone and hexane gives 3α-methoxy-17α-methyl-5α-androstane-2β,17β-diol, melting at about 160–162° C.; $[\alpha]_D = +9°$ (chloroform). This compound has the following formula

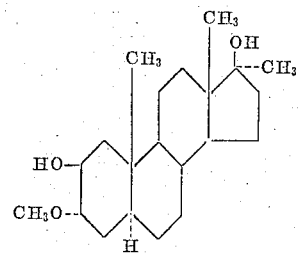

Example 6

To a solution of 2.9 parts of 17α-methyl-5α-androst-2-en-17β-ol (Example 14, U.S. Patent 3,018,298) and 0.4 part of anhydrous sodium acetate in 112 parts of chloroform is added portionwise, with stirring and cooling, 4 parts by volume of 40% peracetic acid in acetic acid solution. This reaction mixture is allowed to stand at room temperature for about 2 hours, and then is washed with dilute aqueous potassium hydroxide, dried over anhydrous sodium sulfate, and concentrated to dryness at reduced pressure. The residue is recrystallized from ethanol to give 2α,3α-epoxy-17α-methyl-5α-androstant-17β-ol, melting at about 205–207° C.; $[\alpha]_D = +0.5°$ (chloroform).

Example 7

A solution of 2 parts of 2α,3α-epoxy-17α-methyl-5α-androstan-17β-ol and 32 parts of methanol containing 0.05 part of concentrated sulfuric acid is refluxed on a steam bath for 1.75 hours. The resultant solution is poured into 100 parts of water containing 0.1 part of sodium bicarbonate. The precipitate which forms is separated, washed with water, and dried. It is then recrystallized from a mixture of acetone and hexane to give 2β-methoxy-17α-methyl-5α-androstane-3α,17β-diol, melting at about 168–170° C.; $[\alpha]_D = +6°$ (chloroform). This compound has the following formula

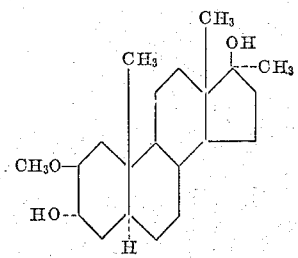

Example 8

To a solution of 1.2 parts of 2β-methoxy-17α-methyl-5α-androstane-3α,17β-diol in 16 parts of acetone is added portionwise, with stirring, an aqueous solution which is 8 N in chromium trioxide and 8 N in sulfuric acid until the brown color persists. Excess chromium trioxide is destroyed by the addition of a few drops of 2-propanol. The liquid is decanted from the precipitate into ice water, and the resultant mixture is extracted with ether. The ether extract is washed first with 5% sodium bicarbonate solution and then with water and then dried over anhydrous potassium carbonate and charcoal. Removal of the solvent under reduced pressure leaves an oil which is dissolved in benzene and chromatographed on a silical gel column. Elution with a 20% solution of ethyl acetate in benzene gives, after evaporation of the solvent, 17β-hydroxy-2β-methoxy-17α-methyl-5α-androstane-3-one, melting at about 149–152° C.; $[\alpha]_D = +76.5°$ (chloroform). This compound has the following formula

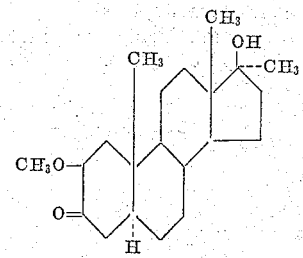

Example 9

A solution of 20 parts of 2α,3α-epoxy-17α-methyl-5α-androstan-17β-ol in 525 parts of glacial acetic acid is heated on a steam bath for 4.5 hours. The resultant solution is concentrated under reduced pressure and the residue is poured into ice water. The amorphous solid which precipitates is separated, washed with 5% sodium bicarbonate solution and then with water. The solid is then dissolved in benzene and chromatographed on a silica gel column. Elution with a 25% solution of ethyl acetate in benzene gives, after evaporation of the solvent and recrystallization of the residue from a mixture of acetone and hexane, 2β-acetoxy-17α-methyl-5α-androstane-3α,17β-diol, melting at about 214–216.5° C. This compound has the following formula

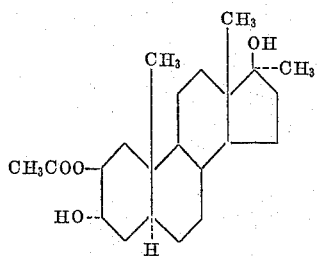

Example 10

To a solution of 3 parts of 2β-acetoxy-17α-methyl-5α-androstane-3α,17β-diol in 38 parts of acetone is added portionwise with stirring an aqueous solution which is 8 N in chromium trioxide and 8 N in sulfuric acid until the brown color persists. Excess chromium trioxide is destroyed by the addition of a few drops of 2-propanol. The liquid is decanted into water whereupon a precipitate forms. The solid is separated, washed with water, and recrystallized from a mixture of acetone and hexane to give 2β-acetoxy-17α-methyl-17β-hydroxy-5α-androstan-3-one, melting at about 155–157.5° C.; $[\alpha]_D = +73.5°$ (chloroform). This compound has the following formula

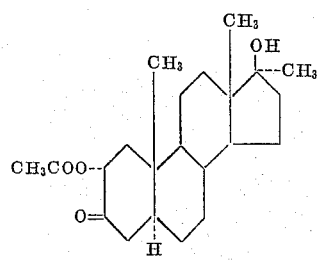

Example 11

An equivalent quantity of propionic acid is substituted for the acetic acid and the procedure of Example 9 is repeated. This gives 2β-propionoxy-17α-methyl-5α-androstane-3α-17β-diol.

The 2β-propionoxy-17α-methyl-5α-androstane-3α,17β-diol is oxidized with chromium trioxide in sulfuric acid according to the procedure described in Example 10. This gives 2β-propionoxy-17α-methyl-17β-hydroxy-5α-androstan-3-one. This compound has the following formula

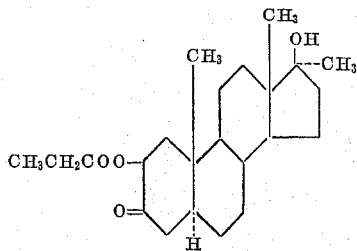

What is claimed is:
1. A compound selected from the group consisting of compounds of the formula

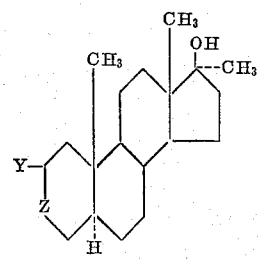

wherein Y is selected from the group consisting of methoxy and (lower alkanoyl)oxy and Z is selected from the group consisting of α-hydroxymethylene and carbonyl; and compounds of the formula

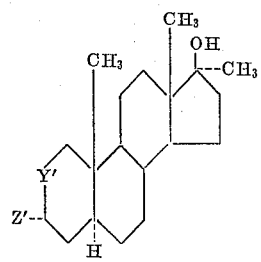

wherein Y' is selected from the group consisting of β-hydroxymethylene and carbonyl and Z' is selected from the group consisting of methoxy and (lower alkanoyl)oxy.

2. A compound of the formula

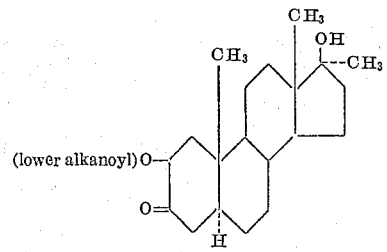

3. 3α-acetoxy-17α-methyl-5α-androstane-2β,17β-diol.
4. A compound of the formula

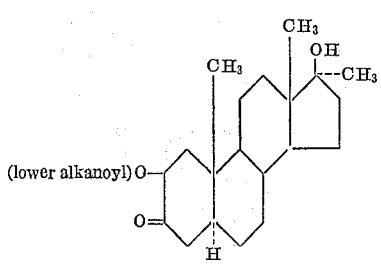

5. 2β - acetoxy - 17β - hydroxy - 17α - methyl - 5α-androstan-3-one.
6. A compound of the formula 7. 2β-acetoxy-17α-methyl-5α-androstane-3α,17β-diol.
8. 3α-methoxy-17α-methyl-5α-androstane-2β,17β-diol.

References Cited in the file of this patent
UNITED STATES PATENTS
2,910,487    Julian et al. _____ Oct. 27, 1959

OTHER REFERENCES
Kowk et al.: J. Org. Chem., vol. 28, p. 423–27, February 1963.

UNITED STATES PATENT OFFICE
CERTIFICATE OF CORRECTION

Patent No. 3,169,134                                February 9, 1965

Paul D. Klimstra

It is hereby certified that error appears in the above numbered patent requiring correction and that the said Letters Patent should read as corrected below.

Column 2, line 34, for "3α-HTHTHnLHTRARAT" read -- 3α-bromo-17α-methyl-5α- --; column 3, line 31, for "-17 α-" read -- -17α- --; same line 31, for "-5α androstan-" read -- -5α-androstan- --; column 4, line 6, for "-androstant-" read -- -androstan- --; line 33, the indistinct word should be -- -methyl- --; column 6, lines 54 to 64, the lower left-hand portion of the formula should appear as shown below instead of as in the patent:

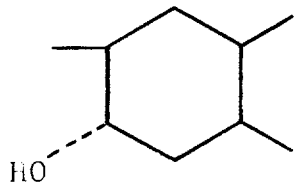

Signed and sealed this 6th day of July 1965.

(SEAL)
Attest:

ERNEST W. SWIDER                                EDWARD J. BRENNER
Attesting Officer                                Commissioner of Patents